(12) United States Patent
Matsuoka

(10) Patent No.: US 6,438,341 B1
(45) Date of Patent: Aug. 20, 2002

(54) DRIVE TRANSMISSION FOR PHOTOSENSITIVE DRUM WITH FIRST AND SECOND ENGAGING MEMBERS, AND URGING MEANS FOR ENGAGING THE FIRST AND SECOND ENGAGING MEMBERS

(75) Inventor: Isao Matsuoka, Susono (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/713,233

(22) Filed: Nov. 16, 2000

(30) Foreign Application Priority Data

Nov. 18, 1999 (JP) ............................................ 11-328341

(51) Int. Cl.⁷ .............................................. G03G 15/00
(52) U.S. Cl. ........................................ 399/117; 399/167
(58) Field of Search ................................. 399/117, 167, 399/111, 110

(56) References Cited

U.S. PATENT DOCUMENTS

| | | | | |
|---|---|---|---|---|
| 5,132,728 A | * | 7/1992 | Suzaki et al. ................. | 399/167 |
| 5,930,562 A | * | 7/1999 | Noda et al. .................. | 399/114 |
| 6,006,058 A | * | 12/1999 | Watanabe et al. ........... | 399/167 |
| 6,035,159 A | * | 3/2000 | Azuma et al. ............... | 399/111 |
| 6,058,280 A | * | 5/2000 | Kumar et al. ................ | 399/117 |
| 6,169,866 B1 | * | 1/2001 | Watanabe et al. ........... | 399/111 |
| 6,175,705 B1 | * | 1/2001 | Harada et al. ............... | 399/117 |
| 6,175,706 B1 | * | 1/2001 | Watanabe et al. ........... | 399/167 |
| 6,198,891 B1 | * | 3/2001 | Ishida et al. ................. | 399/117 |
| 6,201,935 B1 | * | 3/2001 | Terada et al. ................ | 399/13 |
| 6,240,266 B1 | * | 5/2001 | Watanabe et al. ........... | 399/117 |

* cited by examiner

Primary Examiner—Quana M. Grainger
(74) Attorney, Agent, or Firm—Fitzpatrick, Cella, Harper & Scinto

(57) ABSTRACT

An image forming apparatus including a first engaging member fixed to a rotary shaft of a photosensitive drum, a second engaging member into which an engaging portion engageable with the first engaging member, a positioning hole fitting onto the rotary shaft to support the rotary shaft, and a shaft portion fitted into a bearing portion arranged in an apparatus main body to be rotatably supported by the bearing portion, and a gear connected to a driving source are integrally formed, and an urging member for urging the second engaging member against the first engaging member in an axial direction of the rotary shaft, wherein with a state in which the shaft portion of the second engaging member is fitted into the bearing portion arranged in the apparatus main body to be rotatably supported by the bearing portion and a state in which the rotary shaft is fitted into the positioning hole of the second engaging member to be supported by the positioning hole, and the engaging portion of the second engaging member is engaged with the first engaging member to connect therebetween by an urging force of the urging member in the axial direction so that a rotary axis of the second engaging member is in position.

11 Claims, 6 Drawing Sheets

DRIVE TRANSMISSION FOR PHOTOSENSITIVE DRUM WITH FIRST AND SECOND ENGAGING MEMBERS, AND URGING MEANS FOR ENGAGING THE FIRST AND SECOND ENGAGING MEMBERS

BACKGROUND OF THE INVENTION

1. Field of the Invention

The present invention relates to an image forming apparatus such as a copying machine, a printer, and a facsimile machine.

2. Related Background Art

Conventionally, there have been known a color image forming apparatus which is a so-called in-line system in which a plurality of photosensitive drums are arranged in tandem. In this image forming apparatus, while a transfer material is borne and conveyed by an electrostatic transfer belt stretched around and tensioned by a plurality of rollers, toner images of yellow, magenta, cyan and black are sequentially transferred onto the transfer material by four photosensitive drums arranged along a conveying path of the transfer material. A color image is formed by superimposing the respective colors.

This structure has been recently a focus of attention since a printing operation can be performed at high speed. However, since the respective colors are formed by the four photosensitive drums, further accuracy is required with respect to a rotation driving of the photosensitive drums in comparison with a color image forming apparatus constructed such that the colors are superimposed via four conveying paths every color with respect to a single photosensitive drum (hereinafter simply referred to as "four path system").

Namely, a gear train is generally adopted to drive the photosensitive drum, and an uneven rotation at low frequency in one revolution component of the gear, etc. is inevitably generated. However, in the case of the four path system, an accumulative pitch error of the gear, etc. are avoided by setting a reduction gear ratio of the driving gear train to a combination of integers, and image forming positions of the respective colors can be registered with each other.

However, in the case of the in-line system, the plural photosensitive drums are independently arranged. Therefore, the driving gear trains are also independent and it is difficult to take the above avoiding measure as in the four path system. Therefore, there is a fear that color misregister is caused by faulty registrations of the image forming positions of the respective colors.

Accordingly, an equal accuracy or more is required with respect to a banding caused by engagement of the gear etc.

The banding will next be explained. When line images having a small equal intervals in a sub-scanning direction and drawn in a direction perpendicular to a conveying direction of the transfer material, an image of a medium density, or the like are printed, the image is formed by changing the interval of the line images, dots, etc. when a rotation speed of the photosensitive drum is periodically changed. The density looks dense in a narrow interval area, and looks light in a wide interval area. Accordingly, it is recognized in the human eyes as a gradual uneven density corresponding to the periodic change of the rotation speed of the photosensitive drum.

Such a defect in the image is called a banding, an uneven pitch, or a regular striped pattern. The period from about 0.3 mm to several mm is conspicuous in human visible sensitivity. Therefore, when the gear train is used in the driving of the photosensitive drum, the banding corresponding to the periodic change in the rotation speed of the photosensitive drum is easily caused among defects caused by the engagement every one tooth of the gear and the uneven rotation every one revolution.

A gear coupling system and a coaxial coupling system are conventionally adopted as a means for transmitting a rotation driving force from a driving source arranged on an apparatus main body side to the photosensitive drum. In the gear coupling system, a driving gear on the apparatus main body side connected to the driving source is connected to and disconnected from a gear coaxially fixed to the photosensitive drum. In the coaxial coupling system, a driving side coupling on the apparatus main body side is axially moved and is connected to and disconnected from a driven side coupling coaxially fixed to the photosensitive drum.

When the gear coupling is adopted in the above conventional example, a structure is simple and the cost therefor can be reduced.

In contrast to this, when the coaxial coupling is adopted, the gear train can be completed on the apparatus main body side. Therefore, there are advantages in that the banding is easily reduced by using a gear having a diameter larger than an outer diameter of the photosensitive drum and a small module, etc.

The present invention has been made by further developing the above conventional art.

SUMMARY OF THE INVENTION

An object of the present invention is to provide an image forming apparatus in which a rotation accuracy of a photosensitive drum is improved.

Another object of the present invention is to provide an image forming apparatus in which a prevention of an image banding and a prevention of a color misregister are improved.

Another object of the present invention is to provide an image forming apparatus comprising:

a first engaging member fixed to a rotary shaft of a photosensitive drum;

a second engaging member in which an engaging portion capable of engaging with the first engaging member, a positioning hole capable of fitting onto the rotary shaft to support the rotary shaft, and a shaft portion fitted into a bearing portion arranged in an apparatus main body to be rotatably supported by the bearing portion, and a gear connected to a driving source are integrally formed; and urging means for urging the second engaging member against the first engaging member in an axial direction of the rotary shaft of the photosensitive drum;

wherein under a state in which the shaft portion of the second engaging member is fitted into the bearing portion arranged in the apparatus main body to be rotatably supported by the bearing portion and the rotary shaft is fitted into the positioning hole of the second engaging member to be supported by the positioning hole, the engaging portion of the second engaging member is engaged to the first engaging member to connect therebetween by urging force of the urging means in the axial direction whereby a rotary axis of the second engaging member is positioned.

In accordance with the above structure, the shaft portion of the second engaging member is fitted into the bearing portion arranged in the apparatus main body, and is rotatably supported by the bearing portion. The rotary shaft of the photosensitive drum is fitted into the positioning hole of the second engaging member, and is supported by the positioning hole. Thus, a positioning for aligning the second engaging member with an axial direction of the photosensitive drum can be performed in two positions on an apparatus main body side and a photosensitive drum side. Accordingly, a rotary axis center of the second engaging member can be reliably aligned with the center of rotation of the photosensitive drum.

Thus, a change in angular velocity of the photosensitive drum etc. is prevented, and its rotation accuracy can be improved by a simple structure. Accordingly, an image defect such as a banding and a color misregister can be prevented, and the cost therefor can be reduced.

These and other objects, features and advantages of the present invention will become more apparent upon consideration of the following description of the preferred embodiments of the present invention taken in conjunction with the accompanying drawings.

DESCRIPTION OF THE PREFERRED EMBODIMENTS

Figure 1:
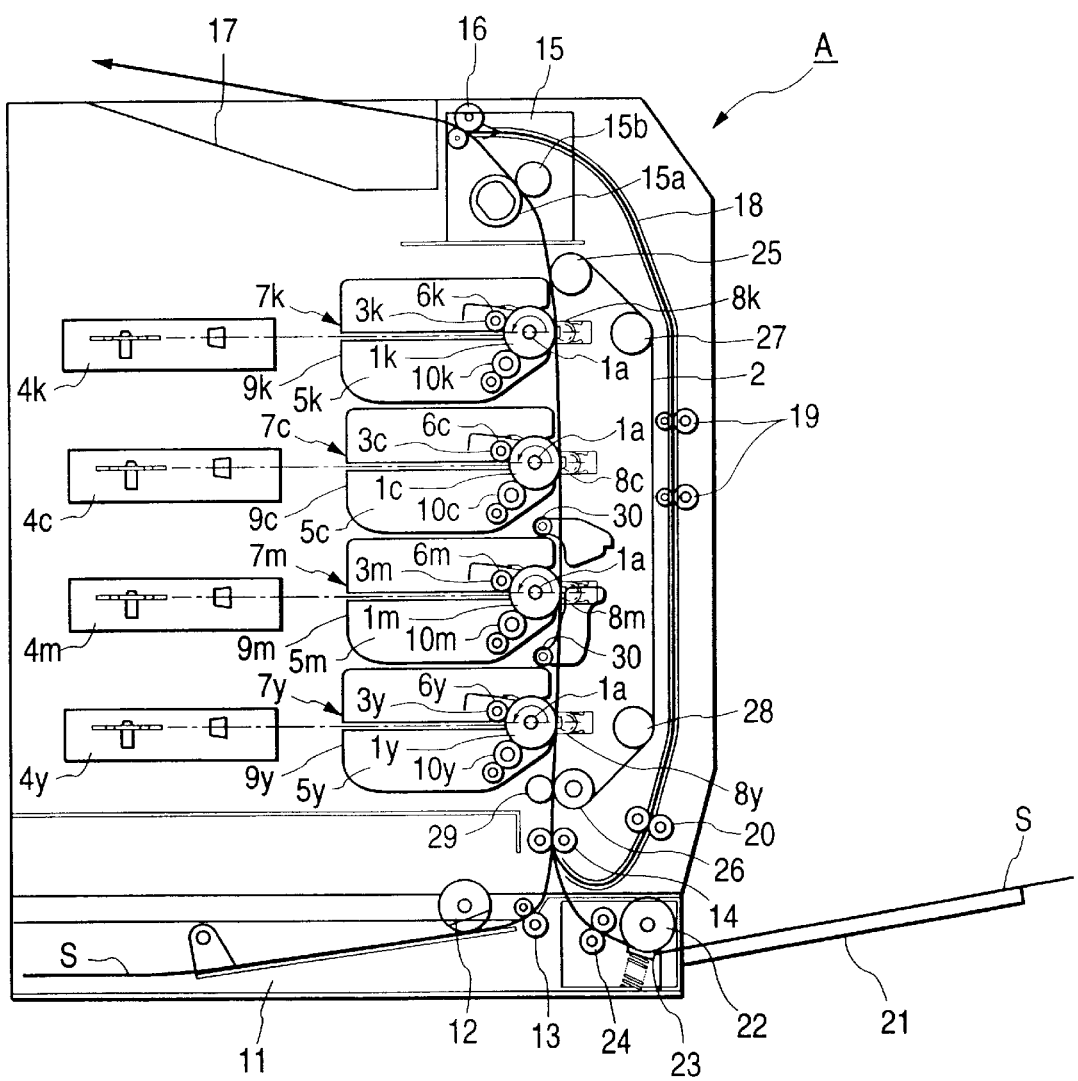
FIG. 1 is a sectional explanatory view showing the structure of a first embodiment of an image forming apparatus according to the present invention.
Figure 2:
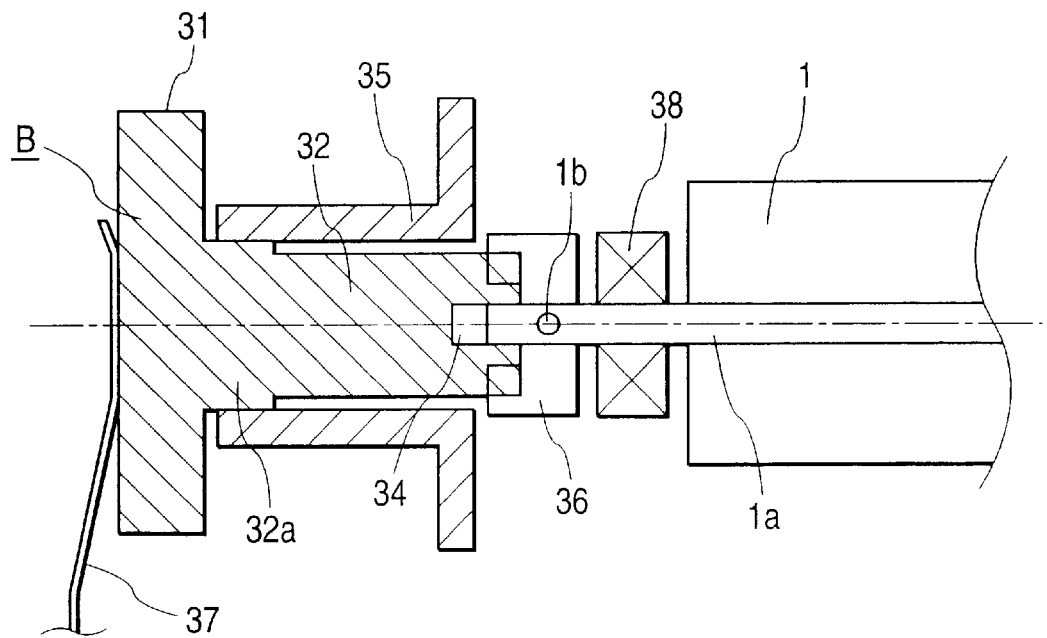
FIG. 2 is a sectional explanatory view showing a state in which a first engaging member fixed to a rotary shaft of an image bearing member and a second engaging member connected to a driving source are engaged with each other.
Figure 3:
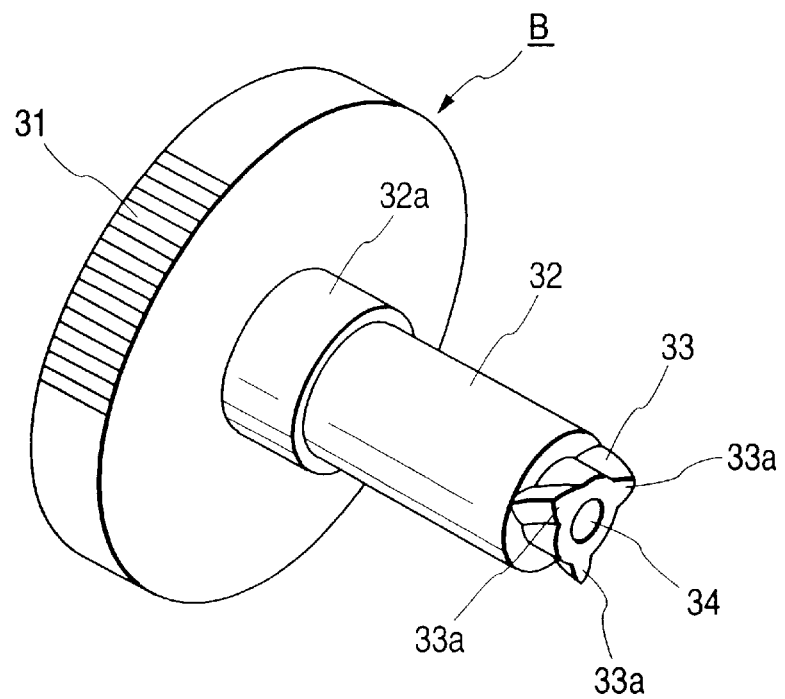
FIG. 3 is a perspective explanatory view showing the structure of the second engaging member connected to the driving source.
Figure 4:
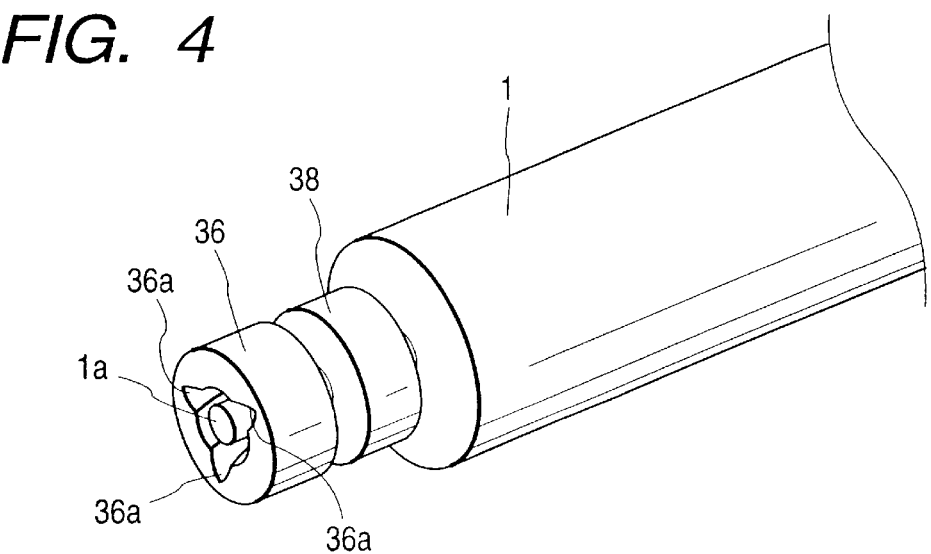
FIG. 4 is a perspective explanatory view showing the structure of the first engaging member fixed to the rotary shaft of the image bearing member.

A first embodiment of an image forming apparatus according to the present invention will be explained concretely with reference to the drawings. FIG. 1 is a sectional explanatory view showing the structure of the first embodiment of the image forming apparatus according to the present invention. FIG. 2 is a sectional explanatory view showing a state in which a first engaging member fixed to a rotary shaft of an image bearing member and a second engaging member connected to a driving source are engaged with each other. FIG. 3 is a perspective explanatory view showing the structure of the second engaging member connected to the driving source. FIG. 4 is a perspective explanatory view showing the structure of the first engaging member fixed to the rotary shaft of the image bearing member.

Figure 5:
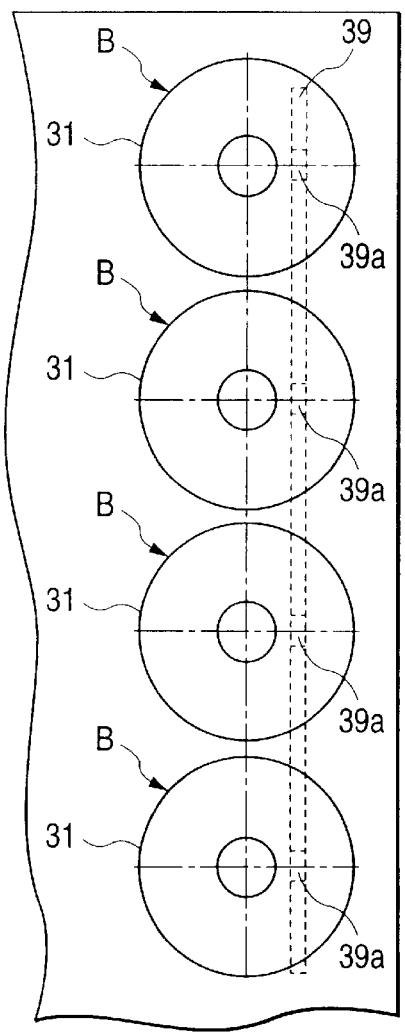
FIG. 5 is a side explanatory view showing the structure of an arrangement of the second engaging member and a releasing member.
Figure 6:
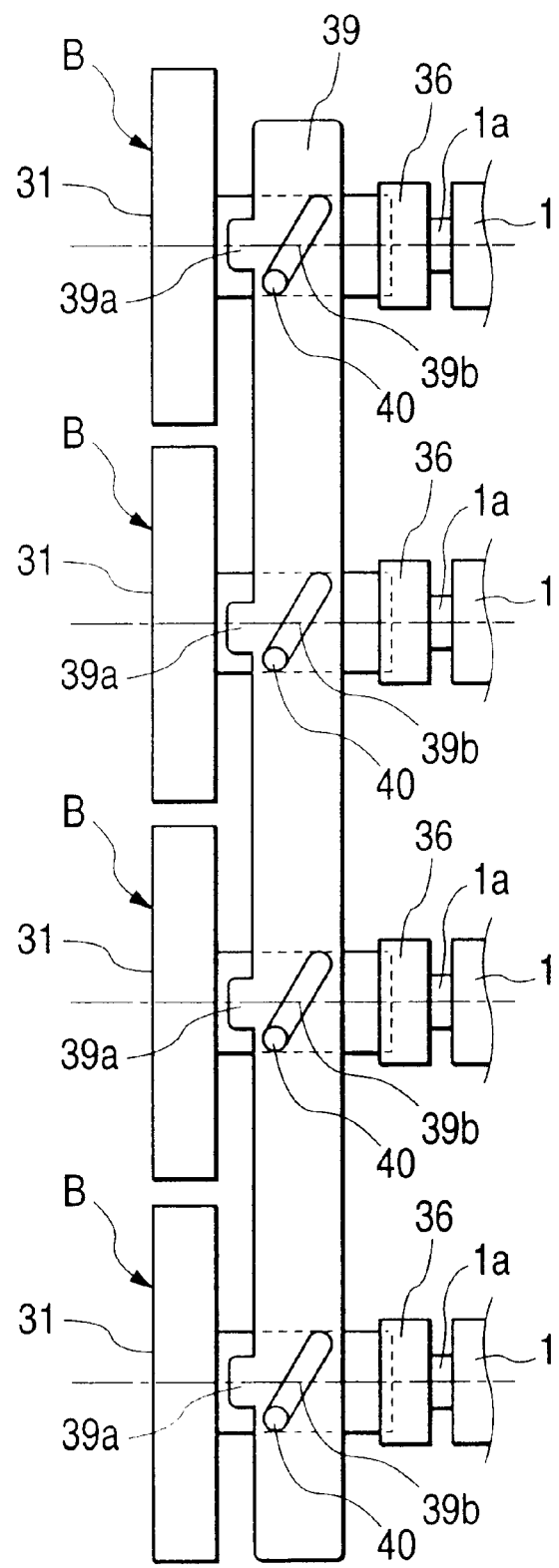
FIG. 6 is a sectional explanatory view for explaining an engagement and releasing operation of the first and second engaging members using the releasing member.
Figure 7:
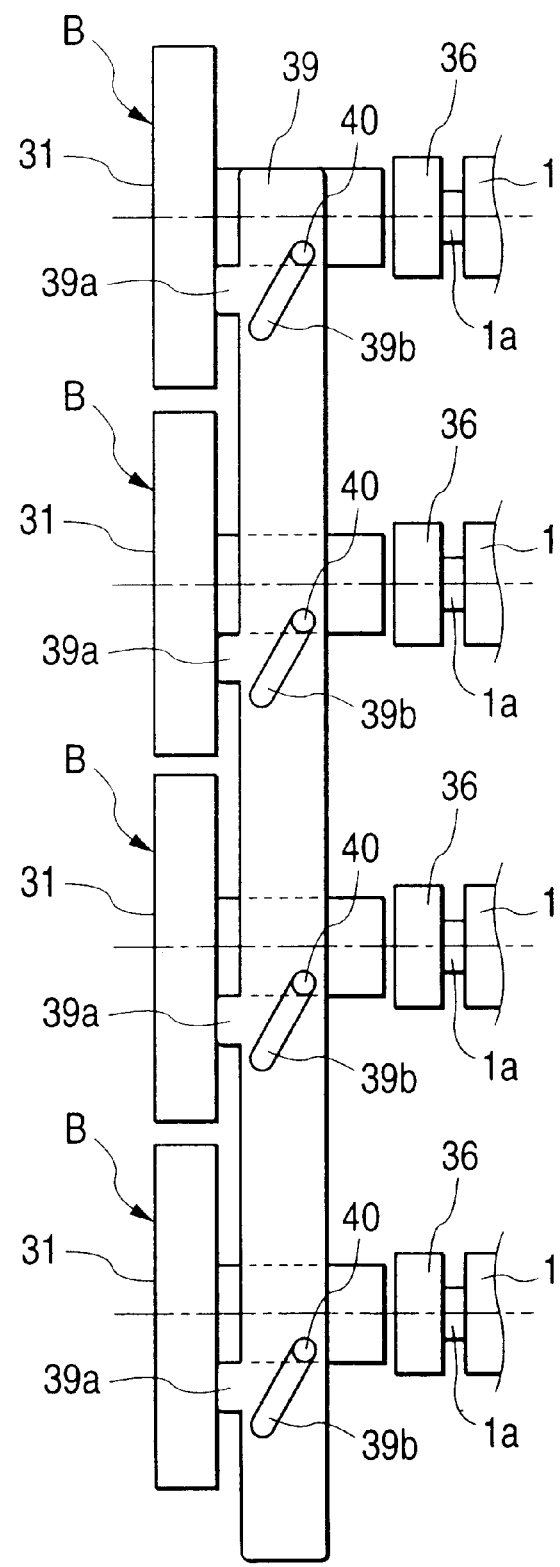
FIG. 7 is a sectional explanatory view for explaining the engagement and releasing operation of the first and second engaging members using the releasing member.

FIG. 5 is a side explanatory view showing the structure of an arrangement of the second engaging member and a releasing member. Each of FIGS. 6 and 7 is a sectional explanatory view for explaining an engagement and releasing operation of the first and second engaging members using the releasing member.

In the embodiment explained below, a sliding portion 32a of a shaft portion 32 of a coupling B is fitted into a cylinder bearing portion 35 arranged in an apparatus main body A, and is rotatably supported by the cylinder bearing portion 35. A drum shaft 1a of a photosensitive drum 1 is fitted into a positioning hole 34 of the coupling B, and is supported by the positioning hole 34. In these supporting states, a protrudent thread 33a formed in an engaging portion 33 of the coupling B is engaged with and connected to a groove 36a of a coupling 36 by an urging force of a leaf spring 37. The engagement is released by moving the coupling B by an interlocking plate 39 in a rotary axis direction and in a rotating direction.

In FIG. 1, a color image forming apparatus A has four electrophotographic photosensitive drums 1y, 1m, 1c, 1k (hereinafter simply referred to as "a photosensitive drum 1") for yellow, magenta, cyan and black as image bearing members arranged in tandem in a vertical direction of FIG. 1. A transfer material conveying belt 2 as a transfer material bearing member is arranged oppositely to each photosensitive drum 1, and attracts, bears and conveys a transfer material S by an electrostatic attractive force.

A rotational driving force is transmitted from an unillustrated drive motor as a driving source to a coupling 36 as a first engaging member described later in detail and a gear 31 of a coupling B as a second engaging member engaged and connected to the coupling 36 so that each photosensitive drum 1 is rotationally driven in the counterclockwise direction of FIG. 1. The coupling 36 is fixed to a drum shaft 1a as a rotary shaft of the photosensitive drum 1.

Primary chargers 3y, 3m, 3c, 3k (hereinafter simply referred to as "a primary charger 3") and exposure means 4y, 4m, 4c, 4k (hereinafter simply referred to as "exposure means 4") are arranged around each photosensitive drum 1 in the order from its upstream side in a rotating direction of the photosensitive drum 1. The primary charger 3 is arranged as a charging means for uniformly charging a surface of the photosensitive drum 1. The exposure means 4 forms an electrostatic latent image by irradiating a laser beam onto the surface of the photosensitive drum 1 uniformly charged by the primary charger 3 on the basis of image information.

Further, developing means 5y, 5m, 5c, 5k (hereinafter simply referred to as "developing means 5") and cleaning means 6y, 6m, 6c, 6k (hereinafter simply referred to as "cleaning means 6") are arranged. The developing means 5 makes toner of each color adhere to the surface of the photosensitive drum 1 on which the electrostatic latent image is formed, and visualizes the electrostatic latent image as a toner image. The cleaning means 6 removes the toner left on the surface of the photosensitive drum 1 after the toner is transferred.

The photosensitive drum 1, the primary charger 3, the developing means 5 and the cleaning means 6 are made integrally into a cartridge which is detachably mountable to the apparatus main body A as process cartridges 7y, 7m, 7c, 7k (hereinafter simply referred to as "a process cartridge 7").

Each of transfer rollers 8y, 8m, 8c, 8k (hereinafter simply referred to as "a transfer roller 8") is arranged in a position opposed to each photosensitive drum 1 through the transfer material conveying belt 2 as a transfer means for transferring a toner image formed on the surface of the photosensitive drum 1 to the transfer material S borne and conveyed by the transfer material conveying belt 2.

The photosensitive drum 1 as an image bearing member is constructed by coating the outer circumferential face of a cylinder made of aluminum with an organic photoconductive layer (OPC). Both end portions of the photosensitive drum 1 are rotatably supported by flanges. Driving force is transmitted from an unillustrated drive motor to one end portion of the photosensitive drum 1 so that the photosensitive drum 1 is rotationally driven in the counterclockwise direction of FIG. 1.

The primary charger 3 is a conductive roller formed in a roller shape. This roller abuts on the surface of the photosensitive drum 1, and a charging bias voltage is applied to this roller by an unillustrated power source so that the surface of the photosensitive drum 1 is uniformly charged.

The exposure means 4 has a polygon mirror, and an image light corresponding to an image signal is irradiated from an unillustrated laser diode onto this polygon mirror.

The developing means 5 has toner containing portions 9y, 9m, 9c, 9k (hereinafter simply referred to as "a toner containing portion 9") for containing toners of the respective colors of yellow, magenta, cyan and black, developing rollers 10y, 10m, 10c, 10k (hereinafter simply referred to as "a developing roller 10") adjacent to the surface of the photosensitive drum 1 and rotated by an unillustrated driving portion, etc. The developing roller 10 performs a developing operation by the application of a developing bias voltage with an unillustrated developing bias power source.

The transfer roller 8 arranged inside the transfer material conveying belt 2 is opposed to each of the four photosensitive drums 1 and abuts on the transfer material conveying belt 2. The transfer roller 8 etc. are connected to an unillustrated transfer bias power source, and electric charges of positive polarity are applied from the transfer roller 8 to the transfer material S through the transfer material conveying belt 2. Thus, each color toner image of negative polarity on the surface of the photosensitive drum 1 is sequentially transferred with an electric field of these electric charges to the transfer material S coming in contact with the photosensitive drum 1 so that the color image is formed.

The transfer material S is constructed of paper, synthetic resin, etc. contained in a sheet feed cassette 11 arranged in a lower portion of the apparatus main body A, and is drawn out by a pickup roller 12 formed in a half moon shape and intermittently rotated. Thereafter, the transfer material S is separated one by one by a retard roller pair 13, and is sent to a registration roller pair 14.

The transfer material S sent by the registration roller pair 14 in a predetermined timing is conveyed to a transfer position between the photosensitive drum 1 and the transfer roller 8 as an image forming means in a state in which the transfer material S is electrostatically attracted and borne by the transfer material conveying belt 2. The toner image formed on the surface of each photosensitive drum 1 is sequentially transferred to the transfer material S so that the color image is recorded to the transfer material S. Thereafter, the transfer material S is heated and pressurized when the transfer material S passes through a fixing means 15 having a rotated heating roller 15a and a pressure roller 15b coming in press contact with the heating roller 15a and rotated by this heating roller 15a. Thus, the toner image is permanently fixed to the transfer material S. Thereafter, the transfer material S is discharged by a discharge roller pair 16 onto a discharge tray 17 arranged in an upper portion of the apparatus main body A.

When the image is formed on each of both sides of the transfer material S, the toner image is fixed to a first side of the transfer material S by the fixing means 15 as mentioned above. Thereafter, the transfer material S is once conveyed to a discharge side by the discharge roller pair 16. When a trailing end of the transfer material S reaches a predetermined position, the discharge roller pair 16 is reversely rotated and the transfer material S is guided to a duplex conveying path 18.

The transfer material S guided to the duplex conveying path 18 is nipped by a diagonal feed roller pair 19 arranged on a front side of the apparatus main body A, and is conveyed downward in a vertical direction. Thereafter, the transfer material S is conveyed and reversely turned in a U-turn by a U-turn roller pair 20. The transfer material S is then again sent to the registration roller pair 14, and a toner image is formed on a second side of the transfer material S as mentioned above. Thereafter, the toner image is fixed to the second side by the fixing means 15, and the transfer material S is discharged onto the discharge tray 17 by the discharge roller pair 16.

The transfer material S rested on a manual feed tray 21 is similarly separated and fed one by one by cooperating a feed roller 22 and a separation pad 23 brought into press contact with the feed roller 22. The transfer material S is then conveyed by a conveying roller pair 24 and is sent to the registration roller pair 14. Similar to the above case, after a toner image is formed on the transfer material S, the toner image is fixed by the fixing means 15. The transfer material S is discharged onto the discharge tray 17 by the discharge roller pair 16.

The transfer material conveying belt 2 is rotatably tensioned and supported by four rollers in total constructed by a driving roller 25 and a driven roller 26 as two shafts for tensioning a transfer material conveying surface, and tension rollers 27, 28 for tensioning the transfer material conveying belt 2. The transfer material conveying belt 2 is arranged oppositely to all the photosensitive drums 1.

The transfer material conveying belt 2 is circulatively moved by the driving roller 25 such that the transfer material S is electrostatically attracted to an outer circumferential surface of the transfer material conveying belt 2 opposed to the photosensitive drum 1, and the transfer material S comes in contact with the photosensitive drum 1. Thus, the transfer material S is conveyed by the transfer material conveying belt 2 to a transfer position, and the toner image on the surface of each photosensitive drum 1 is transferred to the transfer material S.

An attracting roller 29 for nipping the transfer material S in cooperation with the transfer material conveying belt 2 and electrostatically attracting the transfer material S to the transfer material conveying belt 2 is arranged in a position opposed to the driven roller 26 on a most upstream side of the transfer material conveying belt 2 in its transfer material conveying direction.

When the transfer material S is conveyed, a bias voltage is applied to the attracting roller 29 so that an electric field is formed oppositely to the attracting roller 29 through the transfer material conveying belt 2 between the attracting roller 29 and the grounded driven roller 26. Thus, dielectric polarization is generated between the transfer material conveying belt 2 and the transfer material S so that electrostatic attractive force is generated therebetween.

When the transfer material S is conveyed by the transfer material conveying belt 2, the image forming apparatus is constructed such that no transfer material S is separated and dropped from the transfer material conveying belt 2 by a conveying auxiliary member. This conveying auxiliary member is arranged on a bearing side (an outer circumferential surface side of the transfer material conveying belt 2) of the transfer material S on the transfer material conveying belt 2, and also has a function for separating the transfer material conveying belt 2 from the photosensitive drum 1.

Namely, as shown in FIG. 1, plural conveying auxiliary rollers 30 coming in contact with the transfer material bearing surface side (outer circumferential surface side) of the transfer material conveying belt 2 and able to be rotated by the transfer material conveying belt 2 are arranged as the conveying auxiliary member. The conveying auxiliary rollers 30 can be moved in unison by an unillustrated cam mechanism in leftward and rightward directions of FIG. 1.

The conveying auxiliary rollers 30 can be brought into contact with the transfer material bearing surface side of the transfer material conveying belt 2 and can be separated from this transfer material bearing surface side. Each of the conveying auxiliary rollers 30 is suitably moved to a position shown in FIG. 1 in which the transfer material conveying belt 2 is located in proximity to the plural photosensitive drums 1 and the toner image is transferred to the transfer material S. Each of the conveying auxiliary rollers 30 is also suitably moved to an unillustrated position in which the transfer material conveying belt 2 is located in proximity to only the black photosensitive drum 1k and the toner image is transferred to the transfer material S, and the transfer material conveying belt 2 is separated from the remaining photosensitive drums 1y, 1m, 1c.

When the color image is formed as the above structure, the conveying auxiliary rollers 30 are escaped in the left-hand side direction of FIG. 1 as shown in FIG. 1, and the transfer material conveying belt 2 abuts on all the photosensitive drums 1. In this state (a position shown in FIG. 1), while the transfer material S fed from the sheet feed cassette 11 is electrostatically attracted to the transfer material conveying belt 2 and is borne and conveyed, the toner image of each color formed on each photosensitive drum 1 is sequentially transferred and the color image is formed. After the color image is fixed by the fixing means 15, the transfer material S is discharged onto the discharge tray 17.

In contrast to this, when a monochromatic (black-and-white) image is formed, the conveying auxiliary rollers 30 are moved in the right-hand side direction of FIG. 1 by operating the unillustrated cam mechanism, and pushes-in the transfer material conveying belt 2 in the right-hand side direction of FIG. 1. Thus, the transfer material conveying belt 2 is separated from the photosensitive drums 1y, 1m, 1c, of the other colors except for the black photosensitive drum 1k.

In this state, the black toner image formed on the photosensitive drum 1k is transferred to the transfer material S, and is fixed by the fixing means 15. Thereafter, the transfer material S is discharged onto the discharge tray 17.

A driving means such as a drive motor as an unillustrated driving source for rotating each photosensitive drum 1 is arranged on this side on the left-hand side of the apparatus main body A. The driving means transmits rotation driving force to the process cartridges 7 of the four colors approximately arranged in the vertical direction.

The photosensitive drum 1, the developing means 5, the cleaning means 6, etc. are included in each process cartridge 7, and the driving force is transmitted to all these members.

The process cartridges 7 of the respective colors are independently arranged and can be detachably mounted to the apparatus main body A. Therefore, drive transmitting portions of the respective colors are also independently arranged approximately in the vertical direction. Each of the drive transmitting portions directly transmits rotation driving force to the photosensitive drum 1 requiring rotation accuracy. However, the other driving forces, e.g., driving forces of the developing means 5 and the cleaning means 6 may be also transmitted by a separate system.

The driving force transmitted to the process cartridge 7 is distributed to each element by a driving system within the process cartridge 7.

As shown in FIGS. 2 and 3, a gear 31, a shaft portion 32, an engaging portion 33 and a coupling B are arranged within the drive transmitting portion of the process cartridge 7. The gear 31 is connected to the driving source and rotates the photosensitive drum 1. The shaft portion 32 is rotated integrally with the gear 31, and has a sliding portion 32a fitted into a cylinder bearing portion 35 arranged in the apparatus main body A and rotatably supported by the cylinder bearing portion 35. The engaging portion 33 is rotated integrally with the shaft portion 32, and is engaged with and connected to a coupling 36 as a first engaging member fixed to the drum shaft 1a of the photosensitive drum 1. The engaging portion 33 transmits the rotation driving force to the photosensitive drum 1. The coupling B constitutes a second engaging member in which the drum shaft 1a of the photosensitive drum 1 is fitted into a positioning hole 34 and can be supported by the positioning hole 34 and this positioning hole 34 is integrally molded by resin etc.

The shaft portion 32 of the coupling B has the sliding portion 32a and a small diameter portion. The sliding portion 32a is constructed by a large diameter portion on a root vicinity side of the gear 31 rotatably supported by the cylinder bearing portion 35 arranged on a side of the apparatus main body A. The small diameter portion has a diameter smaller than an inner diameter of the cylinder bearing portion 35. Only the sliding portion 32a in the large diameter portion of the shaft portion 32 is supported rotatably and movably in the axial direction with required accuracy with respect to the cylinder bearing portion 35.

A clearance is formed between the cylinder bearing portion 35 and the shaft portion 32 on a side of the engaging portion 33 of the coupling B. This clearance is wide to such an extent that no clearance is contrary to the position of a rotary axis of the coupling B determined by fitting the positioning hole 34 of the coupling B to the drum shaft 1a. Further, this clearance can be supported to such an extent that no problem is caused when the coupling 36 and the engaging portion 33 of the coupling B are engaged with each other.

Namely, the sliding portion 32a has a structure for allowing a slight inclination of the shaft portion 32 so as to determine the position of the rotary axis of the coupling B by the drum shaft 1a and the sliding portion 32a fitted into the cylinder bearing portion 35 and rotatably slid.

In the case of a structure in which the shaft portion 32 is supported by only the sliding portion 32a in a state in which there is no photosensitive drum 1, the shaft portion 32 is inclined and no position of the engaging portion 33 of the coupling B is easily determined. Therefore, a problem exists in that it is difficult to engage the engaging portion 33 of the coupling B and the coupling 36 with each other when the photosensitive drum 1 is mounted.

Therefore, in this embodiment, the suitable clearance is formed between the shaft portion 32 and a portion near the engaging portion 33 of the coupling B in the cylinder bearing portion 35. Accordingly, in a nonexistence state of the photosensitive drum 1, the shaft portion 32 is supported by the cylinder bearing portion 35 and the sliding portion 32a, and the cylinder bearing portion 35 and the shaft portion 32 near the engaging portion 33, and positioning accuracy of the engaging portion 33 of the coupling B required to engage the engaging portion 33 of the coupling B and the coupling 36 without any problem is secured. Further, when the photosensitive drum 1 is mounted and the engaging portion 33 of the coupling B and the coupling 36 are engaged with each other, the clearance is secured between the cylinder bearing portion 35 and the shaft portion 32 near the engaging portion 33 of the coupling B so as not to have any influence on the position of the rotary axis of the coupling B determined by the cylinder bearing portion 35, the sliding portion 32a and the drum shaft 1a.

The rotary axis of the gear 31 is inclined in accordance with position accuracies of the cylinder bearing portion 35 and the drum shaft 1a. However, no problem is caused by setting the distance from a root of the gear 31 to the positioning hole 34 to be sufficiently long.

One end of the coupling B supported rotatably and movably in the direction of the rotary axis by the cylinder bearing portion 35 is urged in a direction on a side (the right-hand side in FIG. 2) of the photosensitive drum 1 by a leaf spring 37 as an urging means attached to the apparatus main body A.

The coupling 36 rotated integrally with the drum shaft 1a is fixed to this drum shaft 1a by using a parallel pin 1b. The drum shaft 1a is pivotally supported in a state in which the drum shaft 1a is accurately positioned in the apparatus main body A through a bearing portion 38.

The coupling 36 on a driven side as the first engaging member is fixed to an end portion of the drum shaft 1a, and is engaged with the coupling B on a driving side as the second engaging member so that rotation driving force is transmitted.

Three protrudent threads 33a having a triangular spiral shape are arranged in the engaging portion 33 of the coupling B on the driving side (see FIG. 3). Three grooves 36a having a triangular spiral shape and corresponding to the protrudent threads 33a are formed in the coupling 36 on the driven side (see FIG. 4).

The sliding portion 32a of the shaft portion 32 of the coupling B on the driving side is fitted into the cylinder bearing portion 35 arranged in the apparatus main body A, and is rotatably supported by the cylinder bearing portion 35. The drum shaft 1a of the photosensitive drum 1 is fitted into the positioning hole 34 of the coupling B and is supported by the positioning hole 34. In these supporting states, the protrudent threads 33a of the engaging portion 33 of the coupling B are respectively engaged with and connected to the grooves 36a of the coupling 36 on the driven side by the urging force of the leaf spring 37 in the direction of the drum shaft 1a of the photosensitive drum 1. Thus, the position of the rotary axis of the coupling B is positioned.

When the rotation driving force is transmitted to the gear 31 connected to the unillustrated driving source and the coupling B is rotated in a predetermined direction, the protrudent threads 33a and the grooves 36a are engaged with each other, and the rotation driving force is transmitted from the coupling B on the driving side to the coupling 36 on the driven side. Thus, the couplings B, 36 and the photosensitive drum 1 are integrally rotated.

When the couplings B and 36 are engaged with each other, the rotary axis of the gear 31 is accurately positioned in two positions which are constructed by the sliding portion 32a of the shaft portion 32 of the coupling B slid in the cylinder bearing portion 35 positioned with respect to the apparatus main body A, and the positioning hole 34 of the coupling B fitted onto the drum shaft 1a similarly and accurately positioned with respect to the apparatus main body A.

The generation of a fitting play slightly caused in possibility between the drum shaft 1a and the coupling B is restrained by a shaft center adjusting action using the engagement of the protrudent threads 33a and the grooves 36a having the triangular spiral shape so that no change in angular velocity of the photosensitive drum 1 is easily caused.

FIGS. 5 to 7 are views showing the structure of a releasing mechanism for releasing the engagement of the coupling B on the driving side and the coupling 36 on the driven side. FIG. 5 is a view seen from the left-hand side of the apparatus main body A. The gear 31 of the coupling B during an image forming operation is rotated in the counterclockwise direction of FIG. 5. At this time, the protrudent threads 33a and the grooves 36a having the triangular spiral shape are twisted in the direction of a left-hand screw seen from a direction on this side of FIG. 5 to a deep side direction to engage the couplings B and 36.

With respect to load torque provided when the photosensitive drum 1 is rotated, a corresponding load is provided by the cleaning means 6 in which a cleaning blade abuts on the surface of the photosensitive drum 1. Accordingly, the coupling B on the driving side and the coupling 36 on the driven side are moved in the direction of the rotary axis to separate these couplings from each other while the gear 31 is rotated in the clockwise direction of FIG. 5 in a stopping state of the photosensitive drum 1.

In this embodiment, an interlocking plate 39 as a releasing member is arranged in a right-hand side position from the rotary axis of the coupling B in FIG. 5 with respect to the gear 31 of each of the four couplings juxtaposed approximately in the vertical direction in tandem.

FIGS. 6 and 7 are views in which a peripheral portion of the interlocking plate 39 is seen from a front side (the right-hand side of FIG. 1) of the apparatus main body A. A pressing portion 39a and a cam groove 39b are formed in the interlocking plate 39. The pressing portion 39a abuts on a right-hand side portion from the rotary axis of the gear 31 in FIG. 5, and presses the gear 31 in the left-hand side direction of each of FIGS. 6 and 7. The cam groove 39b is formed to slide the interlocking plate 39 in a slanting direction.

A pin 40 arranged on a side of the apparatus main body A is inserted into the cam groove 39b of the interlocking plate 39. When the interlocking plate 39 is moved in the vertical direction of each of FIGS. 6 and 7, the interlocking plate 39 is moved in the leftward and rightward directions of FIG. 6 along the cam groove 39b while the pin 40 located in a fixing position is engaged with the cam groove 39b.

The interlocking plate 39 is moved downward in FIG. 6 when the engagement of the coupling B on the driving side and the coupling 36 on the driven side is released and when the process cartridge 7 is separated from the apparatus main body A. Thus, while the pin 40 arranged in the apparatus main body A is engaged with the cam groove 39b, the interlocking plate 39 is moved in a left-hand downward slanting direction of FIG. 6.

Since the interlocking plate 39 is moved in the left-hand downward slanting direction of FIG. 6, the coupling B is moved against the urging force of the leaf spring 37 in a direction opposed to the photosensitive drum 1 in the rotary axis direction and in a rotating direction. Thus, the gear 31 is frictionally rotated by the pressing portion 39a of the interlocking plate 39 in the clockwise direction of FIG. 5. While the protrudent threads 33a of the engaging portion 33 of the coupling B and the grooves 36a of the coupling 36 are disengaged from each other, the four couplings B can be simultaneously separated from the respective couplings 36 (see FIG. 7).

Thus, the engagements of the four couplings B and the couplings 36 are simultaneously released by the single interlocking plate 39 so that each process cartridge 7 can be separated from the apparatus main body A.

A moving operation of this interlocking plate 39 is preferably performed in association with the opening and closing operations of an unillustrated front door of the apparatus main body A etc. performed at any time when the process cartridge 7 is mounted and dismounted. A sliding angle of the interlocking plate 39 is preferably set such that a spiral rotation angle of the coupling B frictionally operated by this interlocking plate 39 is smaller than torsional angles of the protrudent threads 33a of the triangular spiral shape in the coupling B and a torsional pitch is shortened.

After the process cartridge 7 is mounted, the interlocking plate 39 is moved upward in FIG. 7. Thus, the coupling B on the driving side is slid in a direction of the coupling 36 on the driven side, and is pressed by the urging force of the leaf spring 37 in the direction of the coupling 36 on the driven side. Thus, the protrudent threads 33a of the engaging portion 33 of the coupling B and the grooves 36a of the coupling 36 are engaged with each other.

In a separating operation of the plural couplings B and 36, driving force transmission engaging surfaces of the couplings B and 36 are inclined in an engaging direction by the rotation driving force. In this separating operation, the interlocking plate 39 constructed by a one-piece part performs moving and pressing operations in an axial direction in which one side of the coupling B is separated from its axial center, and a circumferential direction in which engaging surfaces of the couplings B, 36 are separated from each other. Thus, while the couplings B and 36 are disengaged from each other, the couplings B and 36 can be separated from each other. Accordingly, load applied to the interlocking plate 39 is relatively small and parts can be simplified and operating force can be reduced.

Further, rotation driving accuracy and rigidity of the photosensitive drum 1 can be secured without greatly increasing the cost by performing the releasing operation of the couplings B and 36 with minimum parts.

A coupling means for performing transmission and release of the other rotation driving forces within the process cartridge 7 such as the developing means 5, and the cleaning means 6 can be also embodied by a similar structure. However, positioning of the coupling B for rotating the photosensitive drum 1 is preferentially performed. Therefore, the transmission of the other driving forces desirably has an unillustrated gear coupling structure in which the gear on the driving side and a gear on a side of the process cartridge 7 are engaged and disengaged when the process cartridge 7 is mounted and dismounted.

In accordance with the above structure, the sliding portion 32a of the shaft portion 32 of the coupling B on the driving side is fitted into the cylinder bearing portion 35 arranged in the apparatus main body A, and is rotatably supported by the cylinder bearing portion 35. The drum shaft 1a of the photosensitive drum 1 is fitted into the positioning hole 34 of the coupling B, and is supported by the positioning hole 34. Thus, positioning for aligning the coupling B to a direction of the drum shaft 1a of the photosensitive drum 1 can be performed in two positions on a side of the apparatus main body A and a side of the photosensitive drum 1. Accordingly, the rotary axis of the coupling B can be reliably aligned with the rotary axis of the photosensitive drum 1.

Thus, a change in angular velocity of the photosensitive drum 1 etc. is prevented by a simple structure, and a rotation accuracy is secured. Further, a defect in image such as a banding and a color misregister can be prevented and the cost therefor can be reduced.

Figure 8:
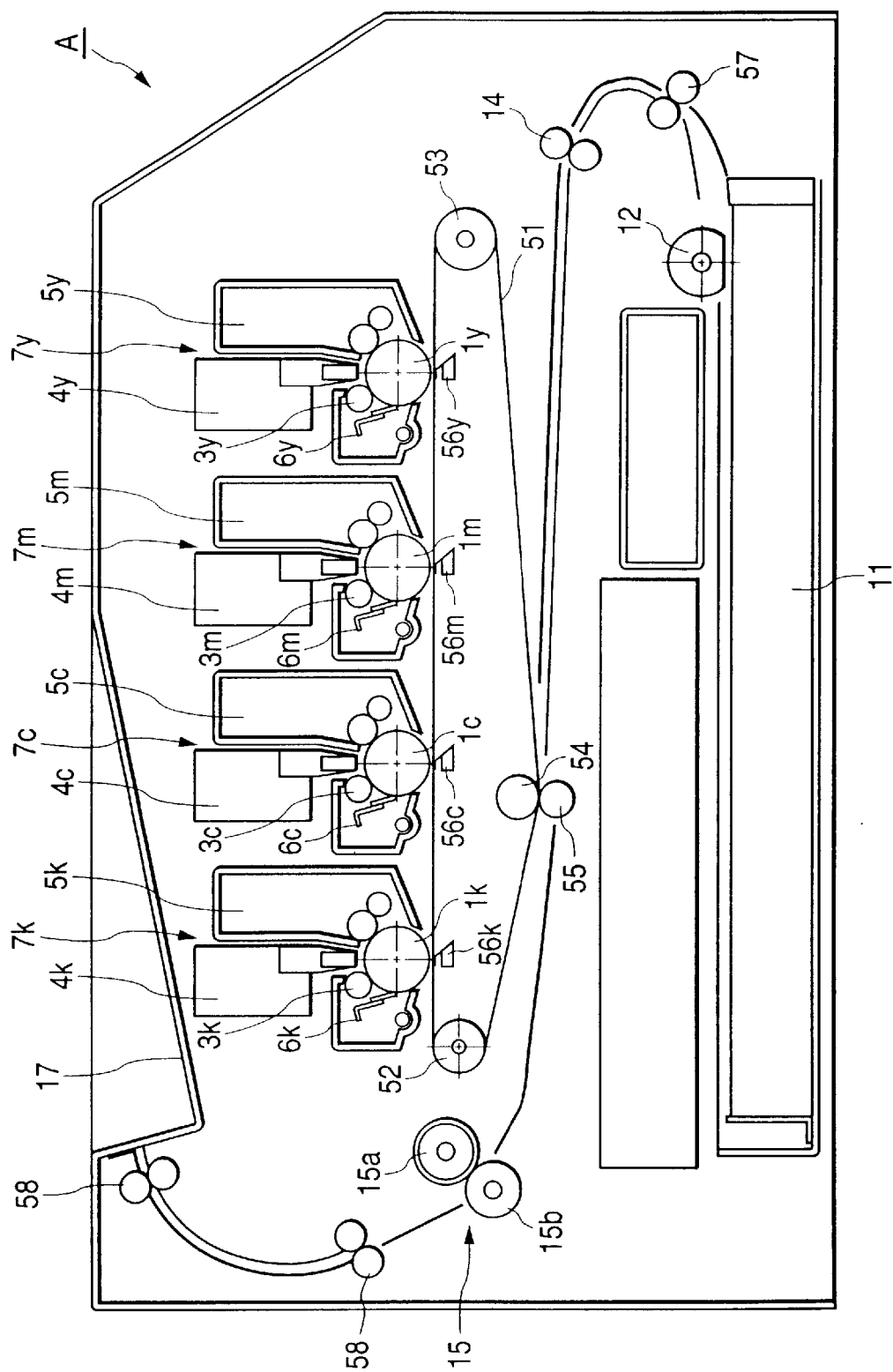
FIG. 8 is a sectional explanatory view showing the structure of a second embodiment of the image forming apparatus according to the present invention.

A second embodiment of the image forming apparatus according to the present invention will next be explained with reference to FIG. 8. FIG. 8 is a sectional explanatory view showing the structure of the second embodiment of the image forming apparatus according to the present invention. Structural members similar to those in the above first embodiment are designated by the same reference numerals, and their explanations are omitted here.

In this embodiment, as shown in FIG. 8, an intermediate transfer belt 51 as an intermediate transfer member is tensioned by a driving roller 52 and driven rollers 53, 54. The intermediate transfer belt 51 is opposed to the photosensitive drums 1 as plural image bearing members juxtaposed with each other in a horizontal direction. A toner image formed on the surface of each photosensitive drum 1 is primarily transferred to the intermediate transfer belt 51. A secondary transfer means 55 is arranged in a position opposed to the driven roller 54 through the intermediate transfer belt 51.

Similar to the above first embodiment, the toner image formed on each photosensitive drum 1 is primarily transferred to the intermediate transfer belt 51 by the operations of transfer means 56y, 56m, 56c, 56k (hereinafter simply referred to as "transfer means 56").

In contrast to this, the transfer material S drawn out of the sheet feed cassette 11 by the pickup roller 12 is separated one by one by an unillustrated separating means and is fed. Thereafter, the transfer material S is sent to the registration roller pair 14 by a conveying roller pair 57, and is conveyed by the registration roller pair 14 between the intermediate transfer belt 51 and the secondary transfer means 55 in a predetermined timing. The toner image primarily transferred on the intermediate transfer belt 51 is secondarilly transferred on the transfer materials by an operation of the secondary transfer means 55.

After the toner image transferred to the transfer material S is fixed by the fixing means 15, the transfer material S is conveyed by the discharge roller pair 58 and is discharged onto the discharge tray 17 arranged in an upper portion of the apparatus main body A.

In this embodiment, similar to the above first embodiment, a coupling 36 is attached to the drum shaft 1a of the photosensitive drum 1, and rotation driving force is transmitted by the coupling B engaged with the coupling 36. The other structures are approximately similar to those in the above first embodiment, and similar effects can be obtained.

This embodiment has the above structure and operation. Accordingly, a shaft portion of the second engaging member is fitted into a bearing portion arranged in the apparatus main body, and is rotatably supported by the bearing portion. A rotary shaft of the photosensitive drum is fitted into the positioning hole of the second engaging member, and is supported by the positioning hole. Accordingly, positioning for aligning the second engaging member with an axial direction of the photosensitive drum can be performed in two positions on an apparatus main body side and a photosensitive drum side. Therefore, the rotary axis of the second engaging member can be reliably aligned with the rotary axis of the photosensitive drum.

Thus, changes in angular velocity of the photosensitive drum, a reduction in rigidity, etc. caused by the play of a connecting portion in the structure of plural parts are prevented, and rotation accuracy is secured. Further, an image defect such as a banding, and a color misregister can be prevented by a simple structure, and the cost therefor can be reduced.

When the second engaging member is formed with resin, the cost of parts is reduced.

As explained above, the rotation accuracy of the photosensitive drum can be improved in the present invention.

While the invention has been described with reference to the structures disclosed herein, it is not confined to the details set forth and this application is intended to cover such modifications or changes as may come within the purposes of the improvements or the scope of the following claims.

What is claimed is:

1. A drive transmission apparatus for a photosensitive drum, comprising:
    a first engaging member fixed to a rotary shaft of the photosensitive drum;
    a second engaging member into which an engaging portion engageable with said first engaging member, a positioning hole fitting onto said rotary shaft to support said rotary shaft, and a shaft portion fitted into a bearing portion arranged in an apparatus main body to be rotatably supported by said bearing portion, and a gear connected to a driving source are integrally formed; and
    urging means for urging said second engaging member against said first engaging member in an axial direction of said rotary shaft,
    wherein with a state in which said shaft portion of said second engaging member is fitted into said bearing portion arranged in said apparatus main body to be rotatably supported by said bearing portion and a state in which said rotary shaft is fitted into said positioning hole of said second engaging member to be supported by said positioning hole, said engaging portion of said second engaging member is engaged with said first engaging member to connect therebetween by an urging force of said urging means in said axial direction so that a rotary axis of the second engaging member is in position.

2. An apparatus according to claim 1, wherein said second engaging member is integrally formed with resin.

3. An apparatus according to claim 1, wherein an engagement between said first engaging member and said second engaging member is effected by an engagement of spiral protrudent threads centered on said shaft portion with spiral grooves centered on said rotary shaft.

4. An apparatus according to any one of claims 1 to 3, wherein an engagement between said first engaging member sand said second engaging member is released by a releasing member for moving said second engaging member along the rotary axis and in a rotating direction against the urging force of said urging means.

5. An apparatus according to claim 4, comprising:
    a plurality of photosensitive drums juxtaposed with each other;
    a plurality of first engaging members fixed to rotary shafts of said plurality of photosensitive drums; and
    a plurality of second engaging members respectively engaged with said plurality of first engaging members,
    wherein engagements between said plurality of first engaging members and said plurality of second engaging members are released by a single releasing member.

6. An image forming apparatus for forming an image on a recording medium, said image forming apparatus comprising:
    a photosensitive drum;
    a developing means for developing a latent image formed on said photosensitive drum;
    transfer means for transferring a toner image formed on said photosensitive drum by said developing means onto the recording medium; and
    a drive transmission apparatus comprising:
        a first engaging member fixed to a rotary shaft of said photosensitive drum;
        a second engaging member into which an engaging portion engageable with said first engaging member, a positioning hole fitting onto said rotary shaft to support said rotary shaft, and a shaft portion fitted into a bearing portion arranged in an apparatus main body to be rotatably supported by said bearing portion, and a gear connected to a driving source are integrally formed; and
        urging means for urging said second engaging member against said first engaging member in an axial direction of said rotary shaft,
        wherein with a state in which said shaft portion of said second engaging member is fitted into said bearing portion arranged in said apparatus main body to be rotatably supported by said bearing portion and a state in which said rotary shaft is fitted into said positioning hole of said second engaging member to be supported by said positioning hole, said engaging portion of said second engaging member is engaged with said first engaging member to connect therebetween by an urging force of said urging means in said axial direction so that a rotary axis of the second engaging member is in position.

7. An image forming apparatus according to claim 6, wherein said engaging member is integrally formed with resin.

8. An image forming apparatus according to claim 6, wherein an engagement between said first engaging member and said second engaging member is effected by an engagement of spiral protrudent threads centered on said shaft portion with spiral grooves centered on said rotary shaft.

9. An image forming apparatus according to any one of claims 6 to 8, wherein an engagement between said first engaging member and said second engaging member is released by a releasing member for moving said second engaging member along the rotary axis and in a rotating direction against the urging force of said urging means.

10. An image forming apparatus according to claim 9, comprising:
    a plurality of photosensitive drums juxtaposed with each other;
    a plurality of first engaging members fixed to rotary shafts of said plurality of photosensitive drums; and
    a plurality of second engaging members respectively engaged with said plurality of first engaging members,
    wherein engagements between said plurality of first engaging members and said plurality of said second engaging members are released by a single releasing member.

11. An image forming apparatus according to claims 6 or 7, wherein a plurality of process cartridges are detachably mountable to said image forming apparatus for forming a color image, each of said plurality of process cartridges having said photosensitive drum and said developing means.

* * * * *

UNITED STATES PATENT AND TRADEMARK OFFICE
CERTIFICATE OF CORRECTION

PATENT NO. : 6,438,341 B1
DATED : August 20, 2002
INVENTOR(S) : Isao Matsuoka

It is certified that error appears in the above-identified patent and that said Letters Patent is hereby corrected as shown below:

<u>Column 13,</u>
Line 53, "sand" should read -- and --.

Signed and Sealed this

Twenty-eighth Day of January, 2003

JAMES E. ROGAN
*Director of the United States Patent and Trademark Office*